Patented Feb. 5, 1935

1,990,422

UNITED STATES PATENT OFFICE 1,990,422

INSECTICIDE

Robert C. White, Philadelphia, Pa.

No Drawing. Application May 13, 1932,
Serial No. 611,243

2 Claims. (Cl. 167—24)

This invention relates to an insecticide composition of matter.

When employed in the manner intended, it is harmless to human beings, household pets, etc., but poisonous to insects, being a contact poison to the latter in that it paralyzes the spiracles of the insects. The composition is intended to be sprayed and has the advantage that it will not stain articles or things on which it is sprayed.

Other advantages of the composition are that it is nonexplosive; that its odor will not contaminate foods.

In addition to being harmless except to insects, this novel composition has a food odor pleasant to insects rendering it attractive to them.

The composition comprises an extract of an insecticide, such, for example, as pyrethrum powder, with "Thioquinozole", to which may be added, if desired, methylprotocatechuic aldehyde. "Thioquinozole" is a trade product, a thiocyanate of the methoxymethyl thiocyano propionate group and the term is to be so understood herein.

The method of manufacture is preferably as follows: One thousand pounds of pyrethrum (No. 20 powder) having an oleo-resin content of seven plus per cent is treated successively with a total of one thousand gallons of a solvent, such for example as hydro carbon distillate, which is preferably refined so that it is both colorless and odorless, to form an extract of the pyrethrum. The one thousand pounds of pyrethrum powder is first treated with five hundred gallons of the mentioned solvent for a period of eighteen hours, after which the liquid is drawn off and three hundred gallons of the solvent is then added to the powder and treatment continued for twelve hours, after which the liquid is withdrawn from the powder, which is then washed with two hundred gallons of the same solvent. The treatment of the pyrethrum powder with the solvent is carried out at a temperature not exceeding 70° Fahrenheit and the extract is collected in underground tanks which have a uniform temperature of from 60° to 65° Fahrenheit. To the extract obtained, twenty gallons of "Thioquinozole" is added, and after thorough agitation of this mixture fifty ounces of methylprotocatechuic aldehyde is added and thoroughly dissolved by agitation, which agitation is carried out in a closed container. The resultant composition of matter then remains undisturbed for a period of at least twenty hours, at a temperature not exceeding 65° Fahrenheit, the composition being completed at the end of this time.

Both pyrethrum and "Thioquinozole" are paralyzants. The former over a given period of time, while more or less slow in becoming effective finally attains a gradual acceleration and reaches a complete paralysis of between 80% and 90%. The latter, however, is quick acting during the initial part of the period and thereafter slowly increases to a point where it attains a paralysis of approximately 90%. The combination of the two results in a paralyzant slightly slower than "Thioquinozole" in becoming effective but much greater than pyrethrum and its paralyzing effects increase more uniformly than either of the two, the paralysis finally attained approximating unity.

Methylprotocatechuic aldehyde is a synthetic of the vanalin group which has the property of imparting to products having a hydrocarbon base a very definite food flavor of the odor of vanillin.

What is claimed is:

1. A composition of matter comprising pyrethrum extract and "Thioquinozole".

2. A composition of matter comprising pyrethrum extract, "Thioquinozole" and methylprotocatechuic aldehyde.

ROBERT C. WHITE.